United States Patent
Chu et al.

(10) Patent No.: US 8,149,698 B1
(45) Date of Patent: Apr. 3, 2012

(54) PROVIDING A SCHEDULE FOR ACTIVE EVENTS TO BE PROCESSED BY A PROCESSOR

(75) Inventors: Chung Cheung Chu, Brossard (CA);
Djordje Konforti, Montreal Quest (CA);
Rafi Rabipour, Cote Saint-Luc (CA);
Christy Yep, Blainville (CA)

(73) Assignee: Genband US LLC, Plano, TX (US)

( * ) Notice: Subject to any disclaimer, the term of this patent is extended or adjusted under 35 U.S.C. 154(b) by 836 days.

(21) Appl. No.: 11/651,427

(22) Filed: Jan. 9, 2007

Related U.S. Application Data (60) Provisional application No. 60/757,449, filed on Jan. 9, 2006.

(51) Int. Cl.
*G01R 31/08* (2006.01)
*H04L 12/28* (2006.01)

(52) U.S. Cl. .................................. 370/230; 370/401

(58) Field of Classification Search .......... 370/230–231, 370/401; 718/102, 104, 105, 107; 709/225, 709/226
See application file for complete search history.

(56) References Cited

U.S. PATENT DOCUMENTS

| | | | | |
|---|---|---|---|---|
| 7,463,939 B1 * | 12/2008 | Mata et al. | | 700/100 |
| 7,586,868 B2 * | 9/2009 | Milton et al. | | 370/328 |
| 2002/0040381 A1 * | 4/2002 | Steiger et al. | | 709/102 |
| 2006/0190943 A1 * | 8/2006 | Haeri | | 718/103 |
| 2006/0236322 A1 * | 10/2006 | Brackman | | 718/103 |

OTHER PUBLICATIONS

Nortel Networks Limited, Product Brief, Nortel Media Gateway, "The GSM-UMTS Media Gateway at Release NSS19," pp. 1-4 (2006).

3GPP, "3rd Generation Partnership Project; Technical Specification Group Core Network and Terminals; Core Network Nb Interface User Plane Protocols (Release 6)," 3GPP TS 29.415 V6.1.0, pp. 1-14 (Dec. 2006).

3GPP, "3rd Generation Partnership Project; Technical Specification Group Radio Access Network; UTRAN Iu Interface User Plane Protocols (Release 7)," 3GPP TS 25.415 V7.3.0, pp. 1-64 (Dec. 2006).

3GPP, "3rd Generation Partnership Project; Technical Specification Group Radio Access Network; Radio Interface Protocol Architecture (Release 6)," 3GPP TS 25.301 V6.0.0, pp. 1-43 (Dec. 2003).

Sjoberg et al., "Real-Time Transport Protocol (RTP) Payload Format and File Storage Format for the Adaptive Multi-Rate (AMR) and Adaptive Multi-Rate Wideband (AMR-WB) Audio Codecs," Network Working Group, RFC 3267 (Jun. 2002).

* cited by examiner

*Primary Examiner* — Aung S Moe
*Assistant Examiner* — Redentor Pasia
(74) *Attorney, Agent, or Firm* — Jenkins, Wilson, Taylor & Hunt, P.A.

(57) ABSTRACT

A switch that interconnects networks provides a scheduling algorithm that determines a number of active events to be processed by a processor in the switch. The active events involve processing of bearer traffic. A schedule tailored to the number of active events is generated. In response to a change affecting the schedule, the schedule is modified. The active events are processed by the processor according to the modified schedule.

20 Claims, 6 Drawing Sheets

| | Transition Instant | Frame count after transition (0: missed frame, 1: single frame, 2: double frame) | | | | | | | |
|---|---|---|---|---|---|---|---|---|---|
| Target | | 7 | 6 | 5 | 4 | 3 | 2 | 1 | 0 |
| Case 1 | 0 | 0 | 0 | 0 | 0 | 1 | 1 | 1 | 1 |
| | 7 | 0 | 0 | 0 | 0 | 1 | 1 | 1 | 1 |
| | 6 | 1 | 1 | 1 | 1 | 2 | 2 | 2 | 2 |
| | 5 | 1 | 1 | 1 | 1 | 2 | 2 | 2 | 2 |
| | 4 | 1 | 1 | 1 | 1 | 2 | 2 | 2 | 2 |
| | 3 | N/A | | | | | | | |
| | 2 | 0 | 0 | 0 | 0 | 1 | 1 | 1 | 1 |
| | 1 | 0 | 0 | 0 | 0 | 1 | 1 | 1 | 1 |
| Case 2 | 0 | 1 | 1 | 1 | 0 | 1 | 1 | 1 | 1 |
| | 7 | 1 | 1 | 1 | 0 | 1 | 1 | 1 | 1 |
| | 6 | 1 | 1 | 1 | 0 | 1 | 1 | 1 | 1 |
| | 5 | 1 | 1 | 1 | 0 | 1 | 1 | 1 | 1 |
| | 4 | 1 | 1 | 1 | 0 | 1 | 1 | 1 | 1 |
| | 3 | N/A | | | | | | | |
| | 2 | 1 | 1 | 1 | 0 | 1 | 1 | 1 | 1 |
| | 1 | 1 | 1 | 1 | 0 | 1 | 1 | 1 | 1 |
| Case 3 | 0 | 1 | 1 | 1 | 1 | 2 | 1 | 1 | 1 |
| | 7 | 1 | 1 | 1 | 1 | 2 | 1 | 1 | 1 |
| | 6 | 1 | 1 | 1 | 1 | 2 | 1 | 1 | 1 |
| | 5 | 1 | 1 | 1 | 1 | 2 | 1 | 1 | 1 |
| | 4 | 1 | 1 | 1 | 1 | 2 | 1 | 1 | 1 |
| | 3 | N/A | | | | | | | |
| | 2 | 0 | 0 | 0 | 0 | 0 | 0 | 1 | 0 |
| | 1 | 1 | 1 | 1 | 1 | 2 | 1 | 1 | 1 |
| Case 4 | 0 | 1 | 1 | 1 | 1 | 2 | 1 | 1 | 1 |
| | 7 | 1 | 1 | 1 | 1 | 2 | 1 | 1 | 1 |
| | 6 | 1 | 1 | 1 | 1 | 2 | 1 | 1 | 1 |
| | 5 | 1 | 1 | 1 | 1 | 2 | 1 | 1 | 1 |
| | 4 | 1 | 1 | 1 | 1 | 2 | 1 | 1 | 1 |
| | 3 | N/A | | | | | | | |
| | 2 | 0 | 0 | 0 | 0 | 1 | 1 | 0 | 0 |
| | 1 | 0 | 0 | 0 | 0 | 1 | 1 | 0 | 0 |

PROVIDING A SCHEDULE FOR ACTIVE EVENTS TO BE PROCESSED BY A PROCESSOR

CROSS-REFERENCE TO RELATED APPLICATION

This application claims the benefit under 35 U.S.C. §119 (e) of U.S. Provisional Application Ser. No. 60/757,449, entitled "Dynamic Events Scheduling in a Resource Limited Environment," filed Jan. 9, 2006, which is hereby incorporated by reference.

TECHNICAL FIELD

The invention relates generally to providing a schedule for active events to be processed by a processor.

BACKGROUND

Mobile or wireless communications networks are capable of carrying traffic (e.g., voice traffic, data traffic, etc.) between mobile stations and other endpoints, which can be another mobile station or an endpoint connected to a network such as a public-switched telephone network (PSTN) or a packet data network (e.g., local area networks, the Internet, and so forth). Examples of wireless communications networks include those that operate according to the GSM (Global System for Mobile) or UMTS (Universal Mobile Telecommunications System) standards, as defined by the Third Generation Partnership Project (3GPP). Another type of wireless communications network is according to the Code Division Multiple Access (CDMA) 2000 standards, as defined by 3GPP2.

A media gateway is often provided between a radio access network (which is part of the core network of the wireless communications network) and a fixed network such as a PSTN, an Internet Protocol network, or other network. The media gateway performs various signal processing tasks with respect to bearer traffic (e.g., voice traffic) communicated between the radio access network and the fixed network. The signal processing includes encoding and decoding of the bearer traffic, with the encoding and decoding typically performed by a digital signal processor (DSP). The DSP is a shared resource that can be shared by multiple call sessions (or call contexts). Multiple events (e.g., encoding or decoding events) associated with the call contexts are scheduled so that the DSP processes the events one at a time according to the schedule. Conventional scheduling techniques do not allow for efficient handling of dynamically changing numbers of events that are to be processed by the DSP.

SUMMARY

In general, according to an embodiment, a scheduling method includes determining a number of active events to be processed by a processor, where the active events involve processing of bearer traffic. A schedule tailored to the number of active events is generated, and in response to a change affecting the schedule, the schedule is modified.

Other or alternative features will become apparent from the following description, from the drawings, and from the claims.

DETAILED DESCRIPTION

In the following description, numerous details are set forth to provide an understanding of some embodiments. However, it will be understood by those skilled in the art that some embodiments may be practiced without these details and that numerous variations or modifications from the described embodiments may be possible.

Figure 1:
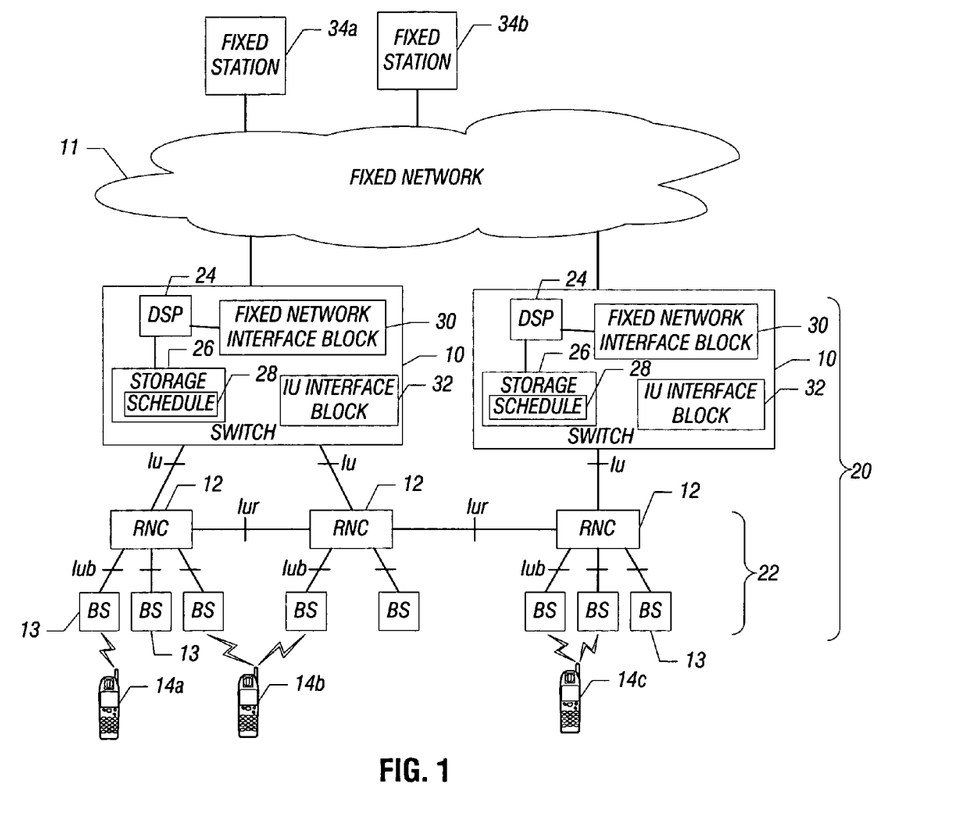
FIG. 1 is a block diagram of a communications network that includes a switch according to an embodiment.

FIG. 1 illustrates an exemplary communications network that includes a wireless core network 20 and a fixed network 11. The wireless core network 20 includes a radio access network 22 that includes a number of radio network controllers (RNCs) 12 and base stations 13. Each RNC 12 is connected to a number of base stations 13, where the base stations 13 are distributed over the territory covered by the wireless core network 20. The base stations 13 include radio frequency (RF) transceivers to enable RF communications with mobile stations, such as mobile stations 14a, 14b, and 14c. Each RNC 12 is also connected to a corresponding switch 10, which in one example is a media gateway. Two switches 10 are depicted in FIG. 1. Each switch 10 is in turn connected to a fixed network 11. Generally, each switch 10 provided between the radio access network 22 and fixed network 11 includes component(s) to perform signal processing tasks with respect to bearer traffic communicated between the radio access network 22 and fixed network 11. Examples of signal processing tasks include echo cancellation, automatic gain control, background noise conditioning, background noise reduction, and transcoding (encoding/decoding). The bearer traffic includes voice traffic, data traffic, and so forth, that is communicated between terminal devices.

The exemplary communications network depicted in FIG. 1 is a Universal Mobile Telecommunication System (UMTS) communications network, as defined by the Third Generation Partnership Project (3GPP). Alternatively, the communications network can be a GSM (Global System for Mobile) network. In another example, the communications network can be a CDMA (Code Division Multiple Access) 2000 communications network, as defined by 3GPP2.

Although depicted as being a single network, the fixed network 11 can actually be multiple fixed networks, and can include one or more of a public switched telephone network (PSTN), Internet Protocol (IP) network, or other types of networks.

In implementations according to UMTS, the link between a switch 10 and an RNC 12 is an Iu interface, and the link between an RNC 12 and a base station 13 is an Iub interface. According to UMTS, RNCs 12 can also communicate with each other over an Iur interface. If other types of communications networks are used, then other types of links can be provided between the RNCs (also referred to as base station controllers) 12, switches 10, and base stations 13.

As depicted in FIG. 1, each switch 10 includes a digital signal processor (DSP) 24 to perform various signal processing tasks, including echo cancellation, automatic gain control, background noise conditioning, background noise reduction transcoding (encoding/decoding), and performance of a scheduling algorithm according to some embodiments. Although only one DSP 24 is depicted in the switch 10 of FIG. 1, it is noted that the switch 10 can include multiple DSPs. However, for purposes of brevity and clarity, the following discussion assumes that the switch 10 includes just one DSP 24. Note that the scheduling algorithm according to some embodiments can also be performed in the context of multiple DSPs in each switch 10.

The DSP 24 is associated with a storage 26 in the switch 10, which storage can be implemented with various types of storage devices. The storage 26 is used to store a schedule 28 developed by a scheduling algorithm executed by the DSP 24, where the schedule 28 indicates the timing for activation and completion of scheduled events to be processed by the DSP 24. An "event" can either be a bearer traffic processing event or a control event. A bearer traffic processing event refers to an event in which the bearer traffic is processed by the DSP. One example of bearer traffic processing includes encoding the bearer traffic to change the bearer traffic from a first format to a second format, such as from a G.711 format (uncompressed speech format) to an adaptive multi-rate (AMR) format (compressed speech format). Decoding of the bearer traffic is the reverse of the encoding process.

Other bearer traffic processing events can include echo cancellation, automatic gain control, background noise conditioning, background noise reduction, and so forth. A control event refers to an event resulting from a control request, such as a control request submitted by an RNC 12 or other requester (a requester in the core network 20 or a requester in the fixed network 11). An example control request that can be submitted by the RNC 12 to the DSP 24 is a request to change the coding rate of a codec provided by the DSP 24.

The switch 10 includes a fixed network interface block 30 (or multiple fixed network interface blocks) for enabling communication between the switch 10 and the fixed network 11. The switch 10 also includes an Iu interface block 32 for enabling communication with an RNC 12 over an Iu interface. Other interface blocks (not shown) are also part of the switch 10, according to some implementations.

The mobile stations 14a-14c are able to establish a call session through the wireless core network 20 and fixed network 11 with fixed stations 34a-34b that are coupled to the fixed network 11. As an example, a fixed station can be a land terminal connected to a PSTN, or a terminal connected to an IP network. A call session established between a mobile station 14 (one of mobile stations 14a-14c) and a fixed station 34 (one of fixed stations 34a-34b) is also referred to as a call context (or equivalently, a "channel").

In a call context between a mobile station 14 and a fixed station 34, from the perspective of the wireless core network 20, uplink bearer traffic travels from the mobile station 14 to the fixed station 34, whereas downlink traffic travels from the fixed station 34 to the mobile station 14. Both uplink and downlink traffic are routed through the switch 10 (and the DSP 24 in the switch). The DSP 24 applies encoding on the downlink traffic, and applies decoding on uplink traffic. Thus, for a given call context, there can be at least two events that have to be processed by the DSP 24 (an uplink bearer traffic processing event and a downlink bearer traffic processing event). Other bearer traffic processing events (discussed above) can also be associated with the call context.

In the communications network of FIG. 1, there can be many call contexts established between different pairs of mobile stations and fixed stations. The call contexts are associated with events that have to be processed by DSPs 24 in the switches 10. Note that in some cases, call sessions between mobile stations or call sessions between fixed stations can also require processing of bearer traffic by the DSPs 24. In fact, a DSP 24 within any given switch 10 often has to support multiple call contexts and their associated events. Effectively, each DSP 24 is a shared resource that can be shared by plural call contexts. Since the DSP 24 is able to process just one event at a time, a schedule (e.g., schedule 28) is developed by the DSP 24 to process the events by the DSP. Thus, the DSP 24 processes the events according to the schedule 28. The bearer traffic events associated with uplink and downlink bearer traffic are referred to as scheduled events, since these events are scheduled by the DSP 24. Also, there can be un-scheduled events that have to be processed in real time, where one example of an un-scheduled event is a control event (such as a control event associated with a control request from an RNC 12 or other requester).

Although the description refers to scheduling events to be processed by DSPs, it is noted that the processing of the events can be performed by other types of shared processors in other embodiments.

The number of scheduled and un-scheduled events (also referred to as "processing threads") can vary in time as calls can be dynamically set up or terminated. In accordance with some embodiments, any given DSP 24 is able to perform dynamic scheduling that is tailored to the number of active events that have to be processed by the DSP 24. As the number of events change, the schedule 28 is dynamically modified or updated by the DSP 24 to produce new schedules. A schedule specifies time instants at which an event is to be initiated by the DSP 24 and time instants at which completion of the event is to occur. Note that the processing times of multiple events that are handled by a DSP can be different. In other words, for example, if the DSP is handling five events, it is possible that each of the five events can have different processing time requirements, with some events requiring more processing time by the DSP than other events.

Note that the scheduled processing threads (events), when processed by the DSP, deliver outputs on a periodic basis. In other words, given a series of periodic intervals (interval 1, interval 2, etc.), the events scheduled to be processed by the DSP are also periodic. For example, for a particular call context involving mobile station 14a and fixed station 34a, one of the events is an encoding event processed by the DSP for downlink bearer traffic from the fixed station 34a to mobile station 14a in the particular call context. The encoding event occurs periodically in the series of periodic intervals (in other words, a first downlink traffic frame for the particular call context is encoded in interval 1, a second downlink traffic frame for the particular call context is encoded in interval 2, and so forth).

The scheduling algorithm is provided with a set of independently specified delivery target instants, which are the time instants at which a requestor (such as an RNC or a fixed station) is requesting delivery of the outputs of the processing threads. Each delivery target instant is a time instant specified within a periodic interval, such that the output of the processing thread is delivered at the same time instant within each of multiple periodic intervals. Note that each of the periodic intervals can include multiple time instants, e.g., T0, T1, T2, etc. As an example, if the processing thread involves processing of downlink voice data, then the specified target instant can be an instant within each periodic interval at which the RNC expects delivery of processed voice data from the media gateway.

The scheduling algorithm that can be used provides for global delay optimization for multiple independent events serviced by a single DSP. The scheduling algorithm can determine a service activation and completion schedule that minimizes the global maximum delay between the actual event completion instants and the corresponding delivery target instants among all events. The scheduling algorithm can also accommodate dynamic updates of independently specified delivery target instants (such as when an RNC sends a request to change the corresponding delivery target instant, e.g., change the delivery target instant from time instant Tx to time instant Ty in each periodic interval). Note that the request sent by the RNC to the DSP to request a change of a delivery target instant is referred to as a time alignment request.

Also, the DSP 24 is able to identify the optimal transition instant at which the DSP 24 transitions from the original schedule to a new, modified schedule. The identified transition instant attempts to preserve call continuity for all active call sessions, without additional DSP resource requirements.

Figure 2:
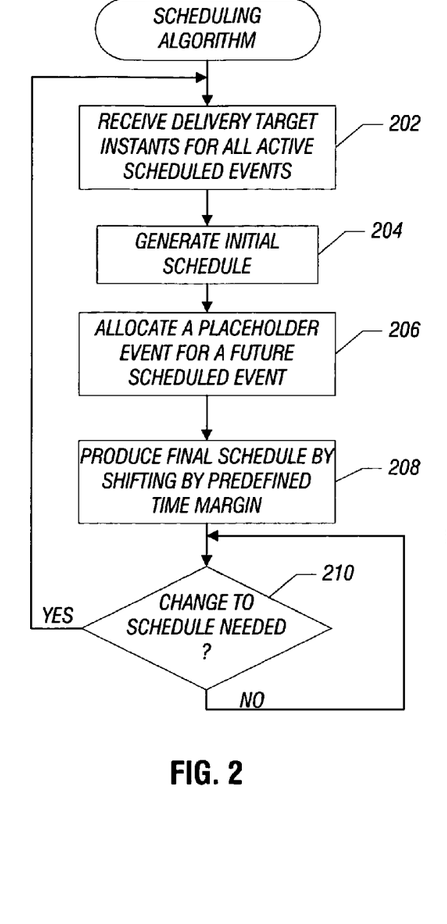
FIG. 2 is a flow diagram of a scheduling algorithm performed by the switch according to an embodiment.

FIG. 2 shows a flow diagram of a scheduling algorithm according to some embodiments. As noted above, the scheduling algorithm is performed by the DSP 24. In other implementations, note that the scheduling algorithm can be performed by another processor. The scheduling algorithm receives (at 202) delivery target instants (the requested time instant within each periodic interval for delivery of an event output) for all active scheduled events. The delivery target instants can be part of a delivery schedule for indicating desired delivery time instants in each periodic interval for the different events. The delivery target instants can be part of a time alignment mechanism provided over the Iu interface, such as the time alignment mechanism provided by UMTS. Based on the delivery target instants for active scheduled events, an initial activation schedule is generated (at 204), which according to some implementations, minimizes (among all scheduled events) the maximum delay between event processing completion instants (scheduled time instants at which event output is ready for delivery) and corresponding delivery target instants. In generating the initial schedule at 204, non-scheduled events (such as control events) are not considered, according to some embodiments.

Figure 3:
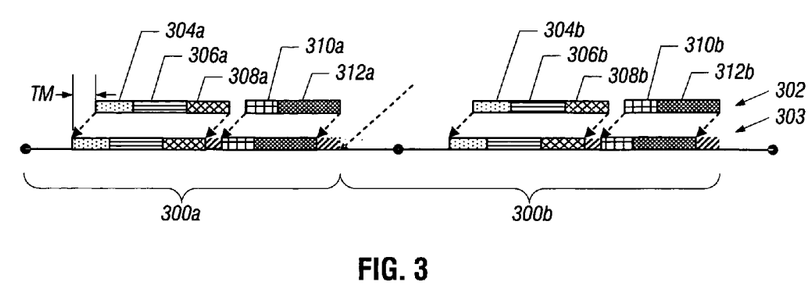
FIG. 3 illustrates modification of an initial schedule to a final schedule, according to an embodiment.

FIG. 3 shows an example of an initial schedule 302. FIG. 3 depicts two time intervals 300a and 300b, where each interval 300a, 300b is a periodic interval. In the first interval 300a, the initial schedule 302 specifies four active events 304a, 306a, 308a, 310a to be processed by the DSP, in addition to a placeholder event 312a. A placeholder event is described further below. Each event 304a, 306a, 308a, 310a, 312a is represented as a rectangular block ("processing block"), where the leading edge (left edge) of the processing block represents activation of the event at the DSP, and the trailing edge (right edge) of the processing block represents the worst-case completion time of the event by the DSP. Note that some of the blocks 304a, 306a, 308a, 310a, and 312a have differing lengths to represent different processing time requirements for the corresponding events.

In the second time interval 300b, the events in the first interval 300a are repeated as events 304b, 306b, 308b, 310b, and 312b. Note that within each periodic interval 300 (300a or 300b), each event is scheduled to start and complete at the same time instant within the interval. For example, in time interval 300a, event 304a is scheduled to start at time instant Tx and complete at time instant Ty. In the second time interval 300b, the corresponding event 304b is scheduled to also start at time instant Tx and complete at time instant Ty.

Referring again to FIG. 2, after generating (at 204) the initial schedule, the scheduling algorithm allocates (at 206) a placeholder event for a future scheduled event. The reserved space for the placeholder event is large enough for the longest scheduled event. Thus, in the example of FIG. 3, event 312a is the placeholder event, which has the same length as the longest event 306a. The allocation of the placeholder event is performed to have the least delay impact on the active scheduled events (in other words, the delivery delay of the scheduled events is minimized).

The scheduling algorithm according to some embodiments also allows for the possibility of occurrence of an un-scheduled event, such as a control event. To allow for occurrence of such an un-scheduled event, the final schedule is produced (at 208) by shifting linearly the schedule of all active scheduled events and the placeholder event by an offset equal to a predefined time margin. The shifting of the schedule of the scheduled events and the placeholder event causes activation of the events to occur earlier (by an amount equal to the predefined time margin). The predefined time margin is set equal to the worst case amount of time that would be required to process an un-scheduled event, such as a control event.

Note that the scheduling algorithm according to some embodiments specifies a shift of just one predefined time margin for an entire interval. This is contrasted to solutions where a predefined time margin is added to each event; consequently, if N (N>1) events are scheduled in a given interval, then N predefined time margins would be added to the interval, which would result in an excessive amount of margin added. In contrast, by shifting all events together by just the single predefined time margin, accommodation is provided for processing of an un-scheduled event without having to provide an excessive amount of margin.

FIG. 3 further illustrates the shifting of the events within each interval to produce a modified schedule 303 (modified from the initial schedule 302). Thus, as depicted in FIG. 3, within each interval 300a and 300b, each of the scheduled events is shifted by an amount equal to the predefined time margin, indicated as TM in FIG. 3. Thus, in the modified schedule 303 (also referred to as the final schedule 303), the activation of each event occurs earlier by a time amount equal to TM with respect to corresponding events in the initial schedule 302.

The shifting of the schedule of the active scheduled events allows for an un-scheduled event to be processed some time within each periodic interval (300a, 300b) without violating required delivery time instants (specified by the initial schedule 302) of scheduled events. For example, in FIG. 3, should the un-scheduled event occur soon after the second event 306a has been started, then the un-scheduled event would be processed by the DSP after completion of the event 306a, but before initiation of the next event 308a. This causes the next event 308a to be delayed (with respect to the activation time instant specified by the final schedule 303); however, since the activation time instants for the events have been shifted earlier by the time margin TM, processing of the un-scheduled event within time interval 300a would not cause the target initiation time instant and delivery time instant (specified by the initial schedule 302) to be violated for events 308a, 310a, and 312a.

Referring again in FIG. 2, after the final schedule has been generated, the scheduling algorithm determines (at 210) whether a change to the schedule is needed. This can occur in response to either a channel profile change or a change in a target delivery time instant. A channel profile change refers to any change resulting from the addition or subtraction of active call contexts. An addition can be due to a new call being assigned to the DSP, while a subtraction can be due to a call being dropped or handed over to another DSP.

In executing a schedule generated according to some embodiments, the DSP behaves as follows in some implementations. Once the DSP enters a reserved time space in the schedule (a reserved time space corresponds a time period in which a processing block or plural concatenated processing blocks are scheduled for processing), the DSP resource is allocated to process the scheduled events as soon as the DSP becomes available. Un-scheduled events are activated by the DSP either inside a reserved time space or outside a reserved time space, provided that there is no scheduled event waiting to be activated. Also, once activated, an event (scheduled or un-scheduled) is processed until completion. As a consequence, activation of any scheduled event can be offset in the worst case by only one scheduled event.

In generating the initial schedule at 204 in FIG. 2, the following steps are performed. Reference is made to the example of FIG. 8A in the following discussion. As discussed above, each event to be processed in a periodic interval has a target delivery instant (the time instant at which delivery of the processed output is required). Each periodic interval is defined as [Tstart, Tend], where Tstart is the beginning time instant of the interval, and Tend is the ending time instant of the interval. The target delivery instants to be processed in the interval fall within the interval [Tstart, Tend].

Figure 8A:
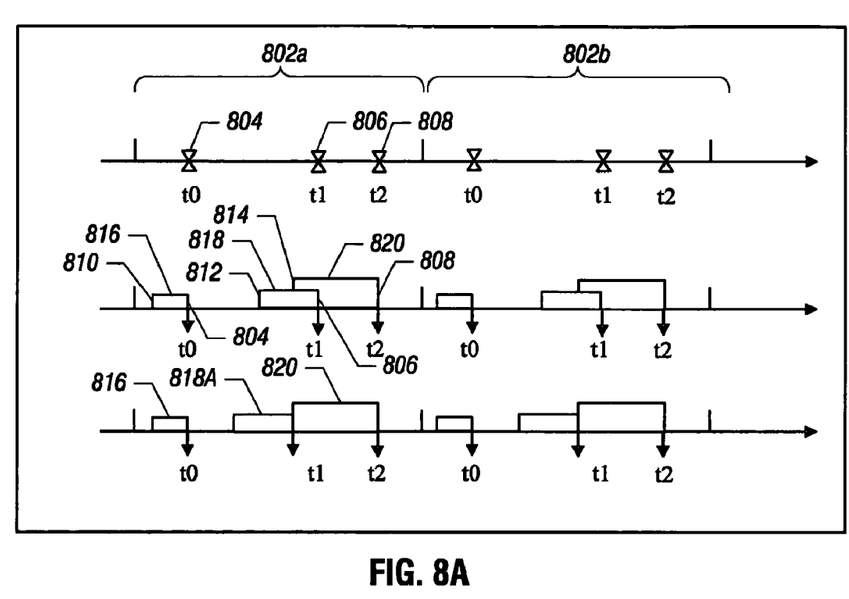
FIGS. 8A-8B illustrate generation of an initial schedule according to an embodiment.

Generating the initial schedule includes the following steps.

Step 1: Given the target delivery instants for a set of scheduled events (to be processed in each interval), the target delivery instants are sorted (such as in ascending or descending order). FIG. 8A shows three target delivery instants 804, 806, 808 (at t0, t1, t2) in each of intervals 802a, 802b.

Step 2: Based on the target delivery instants, activation instants are defined for each scheduled event as a function of the scheduled event's worst-case processing delay. Thus, as depicted in FIG. 8A, activation instants 810, 812, and 814 for the three scheduled events are defined. The activation instants are specified such that processing of each corresponding event can complete in the worst case at the corresponding target delivery instant.

The activation instants 810, 812, and 814 with corresponding target delivery instants 804, 806, and 808 define respective processing blocks 816, 818, and 820. Note that the processing blocks 818 and 820 overlap in FIG. 8A.

Step 3: Next, one of the target delivery instants (e.g., largest target delivery instant, which is t2 in FIG. 8A) is selected, which selected target delivery instant corresponds to an "anchor" event.

Step 4: Then the adjacent event with a lower target delivery instant is selected. If the processing of the adjacent event overlaps with the processing of the anchor event (e.g., processing block 818 overlaps with processing block 820 in FIG. 8A), then the activation instant of the adjacent event is pushed backwardly until there is no overlap. This is illustrated in FIG. 8A, where processing block 818 has been pushed backwardly to become processing block 818A such that processing block 818A does not overlap with processing block 820.

Note that if the adjacent event does not overlap with the anchor event, then there is no need to adjust the activation time instant. The adjacent time instant is then selected as the next anchor, and steps 3 and 4 are repeated until all events have been processed.

Figure 8B:
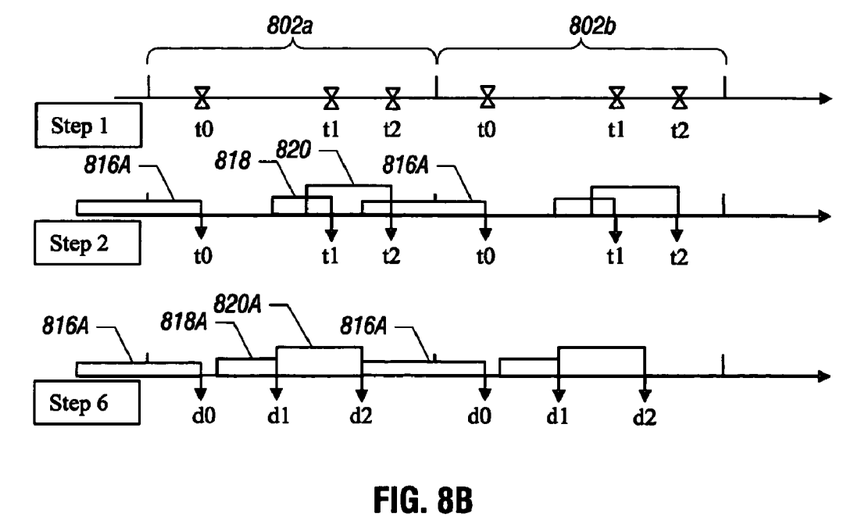

In some scenarios, it is possible that the processing of the first event (corresponding to processing block 816A in FIG. 8B) may overlap with the last event (corresponding to processing block 820 in FIG. 8B) in the preceding interval. If such overlap is detected, then the last event (820) is shifted backwardly in time until it becomes shifted processing block 820A, which does not overlap with the first processing block 816A, as depicted in FIG. 8B.

In addition to the procedure performed in FIG. 2, the scheduling algorithm according to some embodiments also selects the transition instant, which is the instant of time in a particular interval at which an original schedule is switched to a new schedule. Prior to the transition instant, events are still processed (initiated and completed) by the DSP according to the original schedule. After the transition instant, events are processed by the DSP according to the new schedule.

In accordance with some embodiments, the transition instant is selected to minimize the probability of delivery failure for all active scheduled events due to the transition from the old schedule to the new schedule. Transition from an old schedule to a new schedule can cause one of two adverse effects: a packet may be missed, or a packet may be duplicated. Such effects are illustrated by FIGS. 4 and 5.

Figure 4:
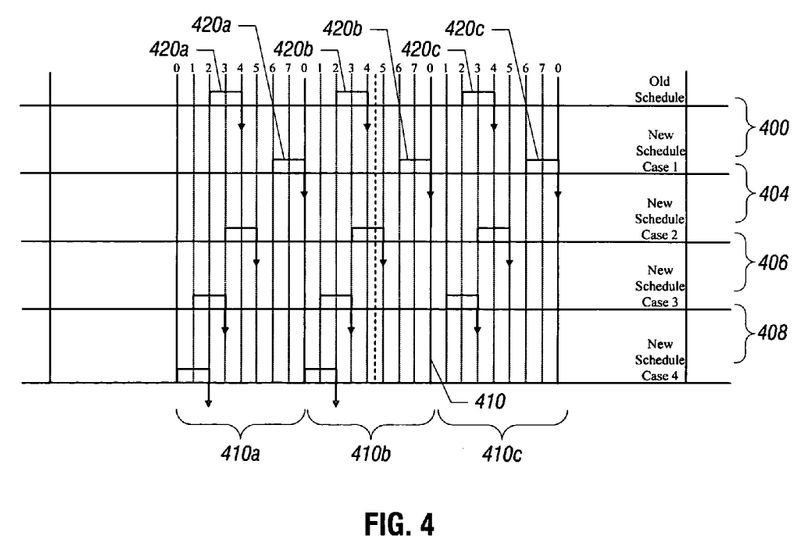
FIG. 4 is a timing diagram illustrating an old schedule and several possible new schedules, according to an embodiment.
Figure 5:
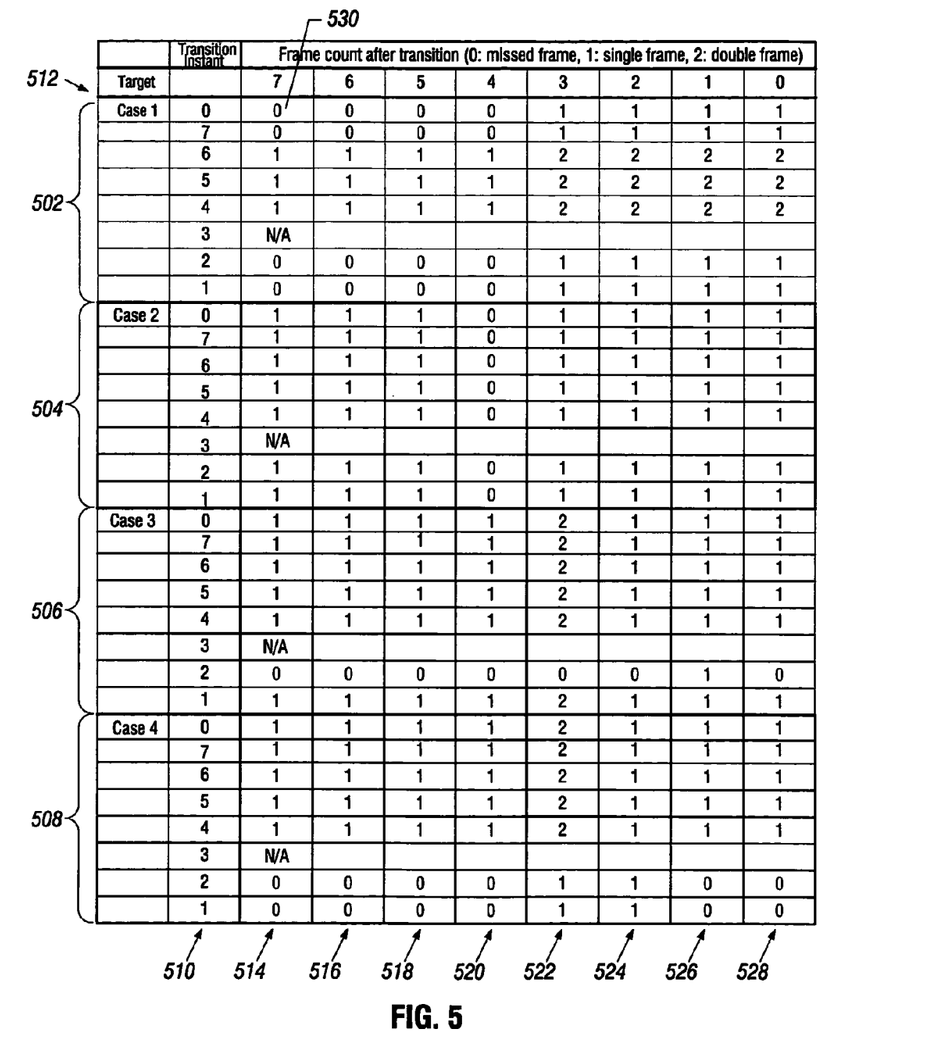
FIG. 5 illustrates a table indicating the effect of selecting different transition instants (instants at which an old schedule is changed to a new schedule), according to an embodiment.

FIG. 4 shows an old schedule 400, and four possible new schedules 402, 404, 406, and 408 (referred to as case 1, case 2, case 3, and case 4, respectively).

Each interval is defined between two solid vertical lines in FIG. 4, where three intervals 410a, 410b, and 410c are shown. In FIG. 4, a solid vertical line represents time instant T0 in each periodic interval, and dotted vertical lines represent time instants T1, T2, T3, T4, T5, T6, and T7. The fact that there are eight time instants depicted within each interval is provided for purposes of illustration, as different implementations can use different numbers of time instants within each periodic interval.

A single event is assumed in the example of FIG. 4. Thus, in FIG. 4, event block 420a represents the scheduled event in interval 410a, event block 420b represents the scheduled event in interval 410b, and event block 420c represents the scheduled event in interval 410c.

According to the old schedule 400, the scheduled event is started at time instant T2 and completes at time instant T4 in each of intervals 410a, 410b, and 410c. The downwardly pointing arrow at the trailing edge of each event block 420a-420c represents that the processed bearer traffic is ready to be delivered, such as to the RNC.

New schedule 402 (case 1) specifies that the scheduled event is to be initiated at time instant T6 (rather than time instant T2) in each interval, which is a delay of four time instants from the old schedule 400. This means that the DSP would not finish processing the event until the end of the time interval. The other new schedules 404, 406, and 408 (case 2, case 3, case 4) depict different amounts of shifts for the initiation and completion of the scheduled event, as compared to the old schedule.

For each of the four possible new schedules, the scheduling algorithm according to some embodiments is presented with the challenge of selecting an optimum transition instant within an interval to transition from the old schedule 400 to the new schedule 402, 404, 406, or 408. FIG. 5 illustrates a table that shows the effect of selecting the transition instant to be one of time instants T0-T7. A first portion 502 of the table of FIG. 5 shows the effect of selecting different transition instants for the new schedule 402 (case 1). Portions 504, 506, and 508 of the table of FIG. 5 depict the effects of selecting different transition instants for the other cases (case 2, case 3, and case 4). Column 510 of the table is the transition instant column that indicates the selected transition instant. A value of "0" indicates that the selected transition instant is time T0 within the interval, a value of "7" indicates that the selected time instant is T7, and so forth.

A row 512 of the table of FIG. 5 indicates the target delivery instant, as specified by a requester (e.g., an RNC). Thus, in row 512, a value of "7" indicates that the requestor desires delivery of the processed bearer traffic at time instant T7, a value of "2" indicates that the requestor desires delivery of the processed bearer traffic at time instant T2, and so forth.

In portion 502, the values in columns 514, 516, 518, 520, 522, 524, 526, and 528 indicate the number of deliveries available to the requester (frame count) after schedule transition has occurred. A value of "0" indicates that one frame would be missed after the transition. A value of "1" indicates that one frame would be received by the requestor after the transition. A value of "2" indicates that double frames (duplicate frames) would be received after the transition. A value of "0" is undesirable (since a frame would be missed) whereas the value of "1" or "2" is acceptable.

Going through a specific example, for case 1, assume that the selected transition instant is T0, and the target delivery instant is T7. These two values for the selected transition instant and the target delivery instant for case 1 correspond to entry 530 in Table 1. Entry 530 contains the value "0," which indicates that a frame is missed after the transition from the old schedule to the new schedule.

This example is discussed in the context of FIG. 4. Assume that the old schedule is to be changed to the new schedule during interval 410b. As noted above, in this example, the selected transition instant is time instant T0. Thus, the transition from the old schedule to the new schedule would not occur until time instant T0 indicated by reference numeral 410 in FIG. 4. Since the transition instant does not occur until time T0 (410), the processed bearer traffic corresponding to event 420b in interval 410b (started at time T2 in interval 410b according to the old schedule 400) will be consumed by the requestor (e.g., RNC) at time instant T7 in time interval 410b (note that in this example the requested delivery time instant is T7). However, after the transition to the new schedule at time interval T0 (410), the event 420c will not be started until time instant T6 in time interval 410c. As a result, at time interval T7 in interval 410c, the target delivery time instant, the output for the event 420c will not be ready. As a result, the requestor will miss receipt of the output in time interval 410c.

Selection of other transition instants for other target delivery instants will cause other effects, as summarized in the table of FIG. 5. Note that "N/A" is indicated in the row for each of the cases corresponding to transition instant T3. That is because the schedule transition cannot occur at a time instant when the DSP is busy processing the event according to the old schedule (note that according to the old schedule, an event is started at time instant T2 and continues through time instant T3, and completes at time instant T4).

Figure 6:
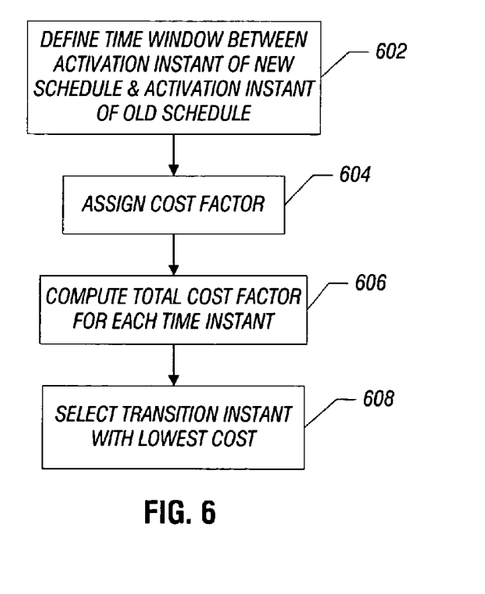
FIG. 6 is a flow diagram of a process of selecting a transition instant, according to an embodiment.
Figure 7:
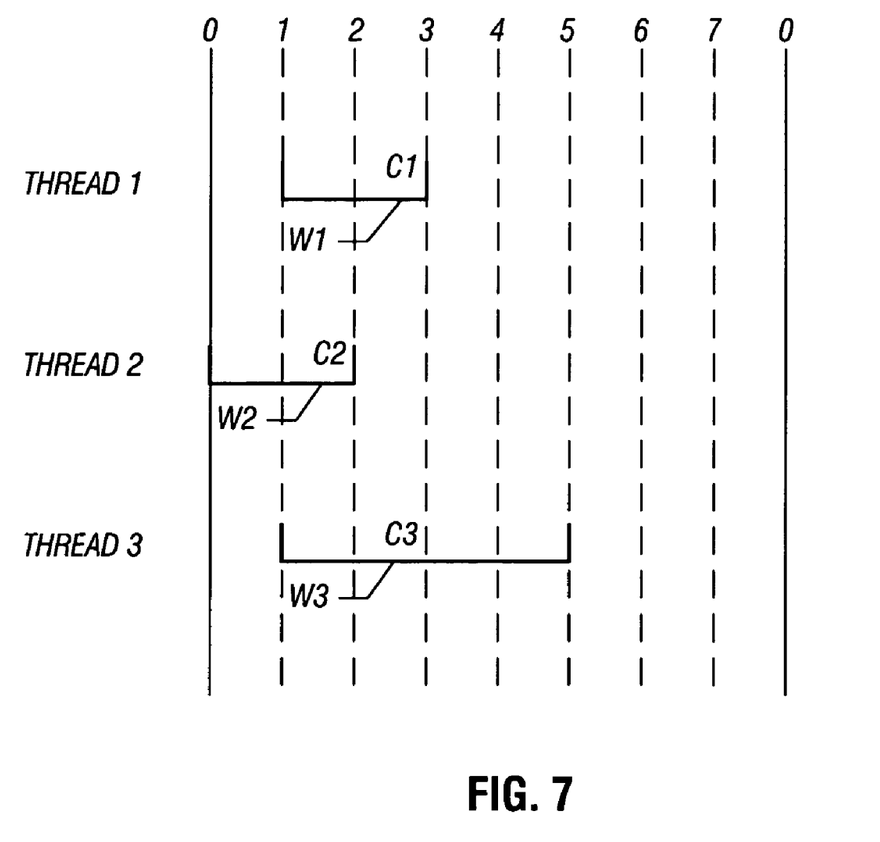
FIG. 7 is a timing diagram to illustrate windows and corresponding cost factors that are considered for selecting a transition instant, in accordance with an embodiment.

FIG. 6 shows a process for selecting a transition instant by the scheduling algorithm according to some embodiments. For each processing thread "i," a time window is defined (at 602) between the activation instant of the new schedule and the activation instant of the old schedule. The window is defined as follows: [New Schedule Thread "i" activation instant, Old Schedule Thread "i" activation instant]. The duration of the window is equal to the old schedule activation instant minus the new schedule activation instant. FIG. 7 shows an example in which three threads are depicted: thread 1, thread 2, and thread 3. As depicted in FIG. 7, thread 1 is associated with window W1, thread 2 is associated with window W2, and thread 3 is associated with window W3 (where each window is defined as above). Note that if the old schedule thread "i" activation instant is smaller than the new schedule thread "i" activation instant, then the duration of the window is incremented by the duration of the time interval.

A cost factor is assigned (at 604) each window, where the cost factor is set equal to a value that is inversely proportional to the duration of the window. The cost factor represents the cost of selecting the transition instant within the window. Outside the window of a particular scheduled event, the cost is assumed to be zero. Thus, if the window of a particular thread is assigned cost Cx, and the window includes two time instants (a first time instant and a second time instant), then the cost of selecting the transition instant within the window at the first time instant is equal to Cx, and the cost of selecting the transition instant within the window at the second time instant is also equal to Cx. The assigned cost factor reflects the fact that it is usually not preferred to have a transition instant within the time window defined above for the particular thread "i." The shorter the width of the time window, the more likely is it that a missing frame can occur when a transition instant is placed in the time window. Therefore, the shorter the window, the higher the cost. As depicted in the example of FIG. 7, window W1 is assigned cost C1, window W2 is assigned cost C2, and window W3 is assigned cost C3.

The total cost factor for each time instant within an interval is then computed (at 606) by summing the cost factors for all the individual processing threads "i" at that time instant. Effectively, the costs Ci of threads i whose windows cover a particular time instant Tj are summed to produce a total cost TCj; in other words, $$TCj = \Sigma_{i=threads\ whose\ windows\ cover\ ins\ tan\ t_j} Ci.$$

The transition instant with the lowest total cost factor is then selected (at 608). Note that the transition instants that can be selected are further limited by the following conditions: (1) the transition instant cannot occur during the processing block of any processing thread in the old schedule; and (2) the transition instant cannot occur during the processing block of any processing thread in the new schedule. Effectively, the technique of selecting the transition instant according to some embodiments reduces or minimizes the number of missed frames after the transition by the requester.

The scheduling algorithm according to some embodiments is thus able to provide one or more of the following features. Delays between actual output delivery instants (as scheduled) and desired output delivery instants (as requested) can be minimized or otherwise reduced. Events with delivery targets are scheduled in the presence of other events that share the same limited resource (e.g., a DSP) in a multi-channel environment (environment with multiple call contexts that use the same resource). The scheduling algorithm supports dynamic numbers of scheduled and un-scheduled events, supports the same or different number of un-scheduled events, supports scheduled and un-scheduled events of different processing delays, and supports scheduled and un-scheduled events of the same or different channels. Also, a transition instant is selected to reduce or minimize output failure. Also, since only a single predefined time margin has to be added to an entire interval (rather than to each processing block of a respective event), a larger number of active processing threads (events) can be supported by the scheduling algorithm.

In some implementations, the scheduling algorithm can be implemented with software instructions executable on the DSP or other processor. Processors include microprocessors, microcontrollers, processor modules or subsystems (including one or more microprocessors or microcontrollers), or other control or computing devices.

Data and instructions (of the software) are stored in respective storage devices, which are implemented as one or more computer-readable or computer-usable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; and optical media such as compact disks (CDs) or digital video disks (DVDs).

While some embodiments have been disclosed with respect to a limited number of embodiments, those skilled in the art will appreciate numerous modifications and variations there from. It is intended that the appended claims cover such modifications and variations as fall within the true spirit and scope of some embodiments.

What is claimed is:

1. A scheduling method for use by a switch that interconnects networks, comprising:
   identifying, by the switch, a plurality of active events to be processed by a processor in the switch, wherein at least some of the active events involve encoding bearer traffic using a specified encoding rate;
   generating an initial schedule tailored to the plurality of active events, wherein generating the initial schedule comprises:
      identifying target delivery times for the active events,
      determining activation times for the active events based on the identified target delivery times,
      determining, based on the activation times and target delivery times, whether overlap of processing of the active events will occur, and
      in response to determining that overlap of processing of the active events will occur, shifting the activation time of at least one of the active events to avoid the overlap in the initial schedule; and
   shifting each of the active events earlier by a common predefined time margin to form an updated schedule such that the activation times in the updated schedule for the corresponding active events are earlier than corresponding activation times in the initial schedule by the common predefined time margin to accommodate for the possibility of occurrence of an un-scheduled control event after generation of the initial schedule, wherein shifting by the common predefined time margin is performed prior to occurrence of the un-scheduled control event, wherein the un-scheduled control event comprises a request to change the specified encoding rate, and wherein the request to change the specified encoding rate is received after the initial schedule is generated.

2. The method of claim 1, further comprising repeating the determining whether overlap and shifting the activation time steps for all of the active events in a particular order, wherein shifting the activation time comprises shifting the activation time backwardly to an earlier time.

3. The method of claim 1, further comprising:
   in response to a change affecting the updated schedule, modifying the updated schedule; and
   processing the active events by the processor according to the modified schedule,
   wherein the change comprises at least one of: (1) receiving another active event to be processed by the processor, the other active event involving processing of bearer traffic; and (2) dropping one of the active events currently processed by the processor.

4. The method of claim 1, wherein the switch comprises a media gateway, and the processor comprises a digital signal processor (DSP), and wherein generating the initial schedule and forming the updated schedule are also performed by the DSP.

5. The method of claim 1, wherein processing the bearer traffic comprises at least one of encoding the bearer traffic and decoding the bearer traffic, and wherein the bearer traffic is communicated between a radio access network and a fixed network through the switch.

6. The method of claim 1, wherein generating the initial schedule comprises generating the initial schedule that further specifies a time block for a placeholder event to accommodate a future scheduled event.

7. The method of claim 1, wherein shifting each of the active events by the common predefined time margin is performed to accommodate the un-scheduled control event within each of plural periodic intervals.

8. The method of claim 1, further comprising:
   in response to a change affecting the updated schedule, modifying the updated schedule;
   processing the active events by the processor according to the modified schedule; and
   selecting a transition time instant at which processing of active events by the processor is performed according to the modified schedule rather than the updated schedule.

9. The method of claim 8, wherein selecting the transition time instant comprises:
   for each of the active events, determining a window between an initiating time instant for a corresponding event in the modified schedule and an initiating time instant for the corresponding event in the updated schedule; and
   assigning cost factors to the corresponding windows,
   wherein selecting the transition time instant is based on the assigned cost factors.

10. The method of claim 9, wherein selecting the transition time instant further comprises:
    computing a total cost for each of plural possible time instants,
    wherein selecting the transition time instant comprises selecting the possible transition time instant associated with a minimum cost factor value.

11. The method of claim 1, further comprising:
    upon occurrence of the un-scheduled control event, processing the un-scheduled control event after completion of one of the active events in the updated schedule but before a start of another one of the active events in the updated schedule.

12. A media gateway for interconnection between networks, comprising:
    a communication interface configured to receive a request to change a specified encoding rate; and
    a digital signal processor (DSP) configured to:
       identify active processing threads to be processed by the DSP, wherein at least some of the active processing threads are associated with encoding bearer traffic using the specified encoding rate;
       produce an initial schedule that specifies activation time instants for activation of the active processing threads by the DSP; and
       modify the initial schedule by shifting the activation time instants earlier by a common predefined time margin to allow for the possibility of occurrence of an un-scheduled control event after generation of the initial schedule, wherein the initial schedule is modified prior to occurrence of the un-scheduled control event, wherein the un-scheduled control event comprises the request to change the specified encoding rate, and wherein the request to change the specified encoding rate is received after the initial schedule is generated.

13. The media gateway of claim 12, wherein the active processing threads comprise processing threads to apply signal processing of bearer traffic to be communicated between the networks.

14. The media gateway of claim 13, wherein the bearer traffic comprises bearer traffic to be communicated between a radio access network and a fixed network.

15. The media gateway of claim 13 wherein the common predefined time margin allows for processing of the un-scheduled control event without delaying the scheduled active processing threads past delivery time instants specified by the initial schedule.

16. The media gateway of claim 12, wherein the specified activation time instants also include an activation time instant for a placeholder event, the placeholder event to provide a placeholder for a future scheduled event.

17. The media gateway of claim 12, wherein the time instants are shifted earlier by shifting each of the time instants earlier by the common predefined time margin.

18. The media gateway of claim 17, wherein the DSP is configured to further:
upon occurrence of the un-scheduled control event, process the un-scheduled control event after completion of one of the processing threads in the modified initial schedule but before a start of another of the processing threads in the modified initial schedule.

19. An article comprising at least a non-transitory storage medium containing instructions that when executed cause a processor to:
identify a plurality of active events to be processed by the processor, wherein at least some of the active events involve encoding bearer traffic using a specified codec to be communicated between different networks;
generate an initial schedule tailored to the plurality of active events, wherein generating the initial schedule comprises:
identifying target delivery times for the active events,
determining activation times for the active events based on the identified target delivery times,
determining, based on the activation times and target delivery times, whether overlap of processing of the active events will occur, and
in response to determining that overlap of processing of the active events will occur, shifting the activation time of at least one of the active events to avoid the overlap in the initial schedule; and
shifting each of the active events earlier by a common predefined time margin to form an updated schedule such that the activation times in the updated schedule for the corresponding active events are earlier than corresponding activation times in the initial schedule by the common predefined time margin to accommodate for the possibility of occurrence of an un-scheduled control event after generation of the initial schedule, wherein shifting by the common predefined time margin is performed prior to occurrence of the un-scheduled control event, wherein the un-scheduled control event comprises a request to change the specified encoding rate, and wherein the request to change the specified encoding rate is received after the initial schedule is generated.

20. The article of claim 19, wherein the instructions when executed cause the processor to further:
upon occurrence of the un-scheduled control event, process the un-scheduled control event after completion of one of the active events in the updated schedule but before a start of another one of the active events in the updated schedule.

* * * * *